(12) United States Patent
Grader et al.

(10) Patent No.: US 11,414,766 B2
(45) Date of Patent: Aug. 16, 2022

(54) SYSTEM AND METHOD FOR GENERATION OF GASES

(71) Applicant: TECHNION RESEARCH AND DEVELOPMENT FOUNDATION LTD., Haifa (IL)

(72) Inventors: Gideon Grader, Haifa (IL); Gennady Shter, Nesher (IL); Hen Dotan, Richan (IL); Avner Rothschild, Haifa (IL); Avigail Landman, Haifa (IL)

(73) Assignee: TECHNION RESEARCH AND DEVELOPMENT FOUNDATION LTD., Haifa (IL)

(*) Notice: Subject to any disclaimer, the term of this patent is extended or adjusted under 35 U.S.C. 154(b) by 0 days.

(21) Appl. No.: 16/982,507

(22) PCT Filed: Mar. 20, 2019

(86) PCT No.: PCT/IL2019/050314
§ 371 (c)(1),
(2) Date: Sep. 18, 2020

(87) PCT Pub. No.: WO2019/180717
PCT Pub. Date: Sep. 26, 2019

(65) Prior Publication Data
US 2021/0017654 A1    Jan. 21, 2021

(30) Foreign Application Priority Data
Mar. 20, 2018 (IL) .......................... 258252

(51) Int. Cl.
C25B 1/04      (2021.01)
C25B 9/70      (2021.01)
C25B 15/02     (2021.01)

(52) U.S. Cl.
CPC .............. *C25B 1/04* (2013.01); *C25B 9/70* (2021.01); *C25B 15/02* (2013.01)

(58) Field of Classification Search
CPC ............ C25B 1/04; C25B 9/70; C25B 15/02
See application file for complete search history.

(56) References Cited

U.S. PATENT DOCUMENTS

| | | | |
|---|---|---|---|
| 5,268,081 A | 12/1993 | Dousek | |
| 11,043,686 B2* | 6/2021 | Wang | H01M 8/04276 |
| 11,050,076 B1* | 6/2021 | Wang | H01M 8/188 |
| 2005/0126924 A1 | 6/2005 | Gomez | |
| 2014/0318979 A1* | 10/2014 | Cronin | C25B 1/55 |
| | | | 205/633 |
| 2015/0017494 A1* | 1/2015 | Amstutz | H01M 8/188 |
| | | | 429/70 |
| 2017/0297913 A1* | 10/2017 | Cronin | C25B 15/08 |
| 2017/0306510 A1* | 10/2017 | Rothschild | C25B 1/04 |

FOREIGN PATENT DOCUMENTS

| WO | WO-2016079746 A1 * | 5/2016 | ............. C25B 15/02 |
|---|---|---|---|
| WO | 2017/200130 A1 | 11/2017 | |

* cited by examiner

*Primary Examiner* — Brian W Cohen
(74) *Attorney, Agent, or Firm* — Vorys, Sater, Seymour and Pease LLP; Anthony Venturino

(57) ABSTRACT

Provided are electrochemical cells and methods for generating hydrogen gas and oxygen gas.

14 Claims, 8 Drawing Sheets

SYSTEM AND METHOD FOR GENERATION OF GASES

TECHNOLOGICAL FIELD

The present disclosure relates to electrochemical cells and methods for generating hydrogen gas and oxygen gas.

BACKGROUND

Transition to renewable energies and green fuels is required for improvement of quality of life. Current energy sources such as oil, coal, and natural gases are considered as a finite resource that becomes increasingly depleted as the global population increases. Although water electrolysis represents a promising technology for energy storage, it is currently limited by various factors such as large power loss due to over-potential of the oxygen evolution reaction (OER), and cost associated with various components in the hydrogen and oxygen compartments. Furthermore, current state of electrolysis technologies are limited in hydrogen production pressure.

International Patent Application publication WO 2016/079746 describes a system and method for generating hydrogen gas from an aqueous solution.

BACKGROUND ART

International Patent Application publication WO 2016/079746.

GENERAL DESCRIPTION

The present invention is based on the development of an electrochemical thermally activated chemical cell (E-TAC) or system comprising a plurality of electrochemical cells or compartments that are configured to allow generation of hydrogen gas and/or oxygen gas in spatial and/or temporal separated steps, without changing the polarity of the system. Cells and/or systems of the inventions and methods described herein for operating these cells and/or systems permit control not only on the type of gases that would be produced, i.e., hydrogen gas or oxygen gas, but also on the ability to produce either one or both of the gases in a continuous, uninterrupted fashion.

In accordance with the invention, each of the cells in the plurality of cells comprises an electrode assembly and thus acts as a separate independent unit for possible generation of both hydrogen gas and oxygen gas. As described herein, hydrogen gas is generated in an electrochemical step on a cathode electrode, in the presence of an applied bias (herein: "hydrogen generation mode"), optionally by water reduction, whereas oxygen gas is generated in a spontaneous chemical step (herein: "oxygen generation mode"), in the absence of bias, optionally by increasing the system, e.g., the electrode assembly (in some embodiments, the anode) temperature, allowing an anode electrode to undergo regeneration and the process to be repeated.

By manipulating and controlling the operation in each of the cells, independently from each other, hydrogen gas may be generated in some of the cells and oxygen gas may be simultaneously generated in other cells, while the production of each of the gases may subsequently be changed such that in cells which have produced hydrogen gas, oxygen gas may be produced and vice versa. This permits generation of hydrogen gas in some of the cells simultaneously to the generation of oxygen gas in other cells, allowing continuous hydrogen gas production or discrete hydrogen gas production. This production sequence may be carried out dependent on the availability of reliable and cheap power (needed for the production of hydrogen gas), or during periods when power is unavailable or available periodically (as no power is required for the production of oxygen gas).

Further, the system provides the ability to tune the timing of operation and the duration of operation of each of the cells independently from one another.

Thus, according to a first of its aspects the invention provides a system for generation of hydrogen gas and/or oxygen gas, the system comprising: two or more electrochemical thermally activated chemical cells (herein 'E-TAC cells'), each of the two or more cells being configured for holding an aqueous solution and comprising an electrode assembly having a cathode electrode and an anode electrode, the two or more cells being configured to generate hydrogen gas in the presence of electrical bias and generate oxygen gas in the absence of bias; and a control unit configured to operate the two or more cells in accordance with an operational pattern.

A system of the invention comprises multiple cells, e.g., a plurality thereof or at least two cells or two or more such cells, each being in the form of a compartment/container comprising at least one electrode assembly and configured for holding an aqueous solution. The number of cells in a system of the invention may vary based on, inter alia, the intended operation, operational patterns, etc.

As detailed herein, each cell is configured to have a dual function such that during application of electric bias to the cell (bias ON) hydrogen gas may be generated and in the absence of an applied bias (bias OFF) spontaneous generation of oxygen gas may take place. In some embodiments, at least one of the two or more cells is non-partitioned, or at least one of the cells is partitioned. In other embodiments, at least two of the two or more cells are partitioned. Where partition exists in one or more of the cells, the partition is in a form permitting free transfer of ions. Thus, the partition may be a membrane such as an ion exchange membrane.

In some embodiments, the two or more cells, in accordance with the present disclosure, are separated, having essentially no fluid or gas communication therebetween.

As detailed herein, each of the two or more cells comprises an electrode assembly that includes an anode and a cathode and thus can serve as a single independent unit, configured for generation of both hydrogen gas and oxygen gas. It should be noted that each of the two or more cells is not a half-cell comprising an electrode and an electrolyte. In some embodiments, the electrode assembly is selected from a mono-polar assembly, a bi-polar assembly, a flat assembly and a rolled assembly.

The electrode assembly comprises a cathode that in the presence of bias generates hydrogen gas optionally by reducing water and further brings about generation of hydroxide ions. Generation of hydrogen gas may be under basic pH, acidic pH or natural pH. Thus, the water medium may be acidic, neutral or basic, may be selected from tap water, sea water, carbonate/bicarbonate buffers or solutions, electrolyte-rich waters, etc. In some embodiments, the cathode is configured to affect reduction of water molecules to generate hydrogen gas and optionally hydroxide ions. In some other embodiments, the cathode reduces hydrogen ions in an aqueous solution to generate hydrogen gas. The cathode may be of a material selected from a metal and electrode materials used in the field. The electrode material may, for example, be selected from nickel, Raney nickel, copper, graphite, platinum, palladium, rhodium, cobalt, $MoS_2$ and their compounds. In some embodiments, the electrode material is not cadmium (Cd) or does not comprise cadmium. In some embodiments, the cathode consists Raney nickel, copper, graphite or platinum.

While the anode may comprise or may consist identical electrode materials as the cathode, the material of the anode must permit at least one redox cycle (reaction), i.e., oxidation, reduction, in accordance with the invention. In other words, the anode in accordance with the invention is capable, under conditions described herein, of reversibly undergoing an oxidation step in the presence of applied bias (anode charging) and a subsequent reduction step in the absence of bias (anode regeneration), to generate oxygen gas. This may be optionally followed by a further redox cycle. The term "reversibly" or "reversibility", when used in connection with the electrode, refers to the ability of the electrode to chemically undergo reduction/oxidation, without reversing the polarity of the system. The turning ON/OFF of bias does not constitute reversal of polarity as known in the art. Therefore, it may be said that the reversibility of the anode is inherent to the electrode material.

As the redox reaction must include proton exchange, the anode material must allow for a redox potential above 1.23V and below 1.8V, versus the hydrogen reversible electrode (RHE), as further disclosed herein. The bias voltage is measured at 25° C., as indicated below.

Thus, in accordance with some embodiments, the system descried herein comprises two or more cells, each configured for holding an aqueous solution and comprising at least one electrode assembly, each having a cathode electrode and an anode electrode, the cathode being configured to affect reduction of water in the aqueous solution in response to an applied electrical bias, to thereby generate hydrogen gas and hydroxide ions, the anode being capable of reversibly undergoing oxidation in the presence of hydroxide ions, and undergoing reduction in the absence of bias, to generate oxygen gas, and a control unit configured to operate the two or more cells in accordance with predetermined operational patterns.

As described herein, the material of the anode may be presented in any one or more of the cells of the invention in a non-oxidized or reduced state, in an oxidized state, in a reduced state, or in any intermediate state (e.g., partially oxidized, partially reduced). When in an oxidized state or a partially-oxidized state the anode electrode is capable of undergoing reduction, in the absence of bias, to generate oxygen gas.

Without wishing to be bound by theory, the process of generating hydrogen gas and oxygen gas in a system of the invention may be broadly described as follows:

Reduction of water by electrolysis generates hydrogen gas and hydroxide ions;

Oxidation of hydroxide ions generates oxygen gas and water via anode charging; and Anode regeneration by water consumption and oxygen generation.

Generally speaking, a sequence of reactions on the anode may be represented by the following schemes, wherein X represents a metal or any electrode material, as disclosed herein:

In a Basic Environment:
Anode: $XH+OH^- \rightarrow X+H_2O+e^-$
Oxygen evolution: $2X+H_2O \rightarrow 2XH+\frac{1}{2}O_2$ In an Acidic Environment:
Anode: $XH \rightarrow X+H^++e^-$
Oxygen evolution: $2X+H_2O \rightarrow 2XH+\frac{1}{2}O_2$
Or
In a Basic Environment:
Anode: $X+2OH^- \rightarrow XO+H_2O+2e^-$
Oxygen evolution: $XO \rightarrow X+\frac{1}{2}O_2$
In an Acidic Environment:
Anode: $X+H_2O \rightarrow XO+2H^++2e^-$
Oxygen evolution: $XO \rightarrow X++\frac{1}{2}O_2$ The complete sequence of reactions in a basic solution, i.e. pH>7 may be represented by the following schemes, wherein X represents a metal such as Ni:
Cathode: $H_2O+e^- \rightarrow \frac{1}{2}H_2+OH^-$
Anode: $X(OH)_2+OH^- \rightarrow XOOH+H_2O+e^-$
Oxygen evolution: $2XOOH+H_2O \rightarrow 2X(OH)_2+\frac{1}{2}O_2$ The complete sequence of reactions in an acidic solution, i.e. pH<7, however, may be represented by the following scheme, wherein X represents a metal such as Ni:
Cathode: $H^++e^- \rightarrow \frac{1}{2}H_2$
Anode: $X(OH)_2 \rightarrow XOOH+H^++e^-$
Oxygen evolution: $2XOOH+H_2O \rightarrow 2X(OH)_2+\frac{1}{2}O_2$ The material of the anode may, for example, be selected, in a similar fashion, from oxides and hydroxides of calcium, strontium, barium, cobalt, nickel, palladium, bismuth, rhodium and more. In some embodiments, the material of the cathode and the material of the anode are different. In some embodiments, the material of either electrode is not Cd or does not comprise Cd.

In some embodiments, the anode comprises or consists nickel hydroxide ($Ni(OH)_2$). In some embodiments, the nickel hydroxide electrode is capable of reversibly undergoing oxidation to a nickel oxyhydroxide (NiOOH) in the presence of hydroxide ions (and applied bias).

In some embodiments, the anode electrode may be present in the two or more cells of the invention in a non-oxidized state ($Ni(OH)_2$), in an oxidized state (NiOOH) or in any intermediate state (e.g., partially oxidized).

The oxidized anode (namely nickel oxyhydroxide) is configured to undergo reduction (anode regeneration) to nickel hydroxide in the absence of electrical bias to generate oxygen gas and to undergo oxidation (anode charging) in the presence of electrical bias to generate water.

In some embodiments, the system of the invention may be adapted or used for generating hydrogen gas.

In some embodiments, the system may be adapted or used for generating hydrogen gas and oxygen gas.

In some embodiments, the system may be adapted or used for generating oxygen gas.

As disclosed herein, oxygen gas may be generated subsequent to generation of hydrogen gas, where the aqueous solution comprises at least one active species capable of oxidizing the anode, e.g., hydroxide ions, or may be directly generated where at least one of the cells in the system utilizes an already-oxidized anode or a partially oxidized anode. Thus, in accordance with such embodiments, the system may comprise two or more cells, each configured for holding an aqueous solution and comprising an electrode assembly having a cathode and an oxidized anode or partially oxidized anode, the oxidized anode being configured to undergo reduction in the absence of electrical bias to generate oxygen gas, and a control unit configured to operate the two or more cells in accordance with a predetermined operational pattern.

Where a non-oxidized anode electrode is used, or in cases the electrode is not fully oxidized, the aqueous solution may further contain at least one active species capable of oxidizing the anode, e.g., hydroxide ions.

The electrical bias, applied bias or system bias refers to an applied voltage or direct current or alternating current established in each electrode assembly in each cell of the two or more cells within a system of the invention. Electrical bias is required for system operation and is measured in the electrode assembly within a cell, between the cathode and the anode.

As may be understood, each cell is equipped with at least one electrode assembly, each assembly comprising an anode and a cathode. The electric bias in each electrode assembly is from 1.23 V to 2.2V. The system bias or cell bias would depend on the configuration of the cells/systems. Where the cell is arranged as a mono-polar cell comprising a single electrode assembly, the bias may be between 1.23V and 2.2V. Where the cell has a stacked arrangement, namely a bipolar arrangement comprising two or more electrode assemblies, each of the assemblies in the stack may have a bias between 1.23V and 2.2V, such that the cell bias may be dependent on the number of electrode assemblies in the cell.

In some embodiments, the applied electric bias is at least 1.23V when measured at 25° C., for a single electrode assembly. In some embodiments, the applied bias may be between 1.23 and 2.2 V, between 1.23 and 2 V, between 1.23 and 1.8 V, between 1.23 and 1.6 V or between 1.23 and 1.5 V, when measured at 25° C., for a single electrode assembly.

In some embodiments, the electric bias is measured in reference to an additional electrode, being a reference electrode, optionally configured for monitoring, e.g., voltage. Non-limiting examples of reference electrodes include Standard hydrogen electrode (SHE), Normal hydrogen electrode (NHE), Reversible hydrogen electrode (RHE), Saturated calomel electrode (SCE), Copper-copper(II) sulfate electrode (CSE), Silver chloride electrode, Palladium-hydrogen electrode, Dynamic hydrogen electrode (DHE), Mercury-mercurous sulfate electrode (MSE) and Mercury-mercury oxide (Hg/HgO).

When oxygen gas is generated in the absence of electrical bias, the E-TAC cell is turned off or operated under a voltage or a direct current that is lower than the detection limit of a voltage or current detection device. In some embodiments, absence of electrical bias is any bias below 1.23V, or any value up to 1.23V (as noted with reference to a monopolar arrangement and correspondingly as defined above for bipolar arrangements).

In some embodiments, the system further comprises a heat source or a heat exchanger. The heat source and/or the heat exchanger is used to set the system temperature, measured in at least one component of the system, e.g., system temperature, cell temperature, electrode temperature or solution temperature. Without wishing to be bound by theory, it is suggested that the generation of oxygen gas is induced or increased by raising in temperature of the anode and/or the aqueous solution. Thus, increasing the temperature of the anode and/or of the aqueous solution may be used to control or modulate generation of oxygen gas under the oxygen generation mode. In some embodiments, the system temperature is room temperature. In some other embodiments, the system temperature is at least 50° C., at times at least 60° C., at times at least 70° C., at times at least 80° C., at times at least 95° C., at times between 50° C. to 95° C., or at times between 60° C. and 95° C.

The system described herein comprises a control unit that permits the synchronization of the system in line with its required function (e.g. continuous demand for hydrogen or temporal demand for hydrogen). The control unit is a component of the system comprising a processing unit for receiving input information and/or providing output information. The control unit may be physically or remotely (e.g. wirelessly) connected to each of the two or more cells and/or to the system as a whole. The control unit may be connectable to a tangible medium such as a computer comprising computer readable instructions and further may comprise a control interface (e.g. panel) which as detailed herein may be used to insert/receive inputs and/or to present/provide output, optionally in accordance with pre-determined algorithms.

A schematic representation of an exemplary control unit is shown in FIG. 1. The control unit (10) comprises a processor (12), which receives data from a data input component (14); a data output component (16); and one or more memory components (18). The system memory may be coupled to the processor. It should be noted that the control unit allows operation of the system based on input data provided for each cell in the system and/or for the system as a whole. For example, the input data may be static input information which is related to the cell/system features per se as well as dynamic input information which may be (i) provided to the control unit prior to operation or (ii) changes during operation of the system. One or more sensor units may further be included, the sensor units may be distributed within each of the cells or monitor the function or a groups of cells of the system as a whole.

The data input information inserted/received by the control unit is at least one of system input information, which may be received directly from the system sensor, or may be inserted manually. Such information may relate to each one of the two or more cells, for example, volume of each one of the two or more cells, information related to the electrodes, for example, anode type, anode size, anode maximum capacity, anode maximal voltage, anode regeneration rate, cathode type, cathode size, cathode maximum capacity, cathode maximal voltage, cathode charging rate, anode and cathode lifetime, information relating to the aqueous solution, for example solution pH, solution composition (optionally electrolyte present therein), water quality, storage tank capacity, and others.

The input information that may alternatively or additionally be inserted/received by the control unit is any input information that may change during operation of the system (dynamic information), and which may be relevant to the operation of the cell/system or to external parameters having to do with consumer factors, cost of electricity use, rate of hydrogen or oxygen consumption; the information may additionally include information regarding the applied bias, hydrogen concentration, hydrogen flow rate, oxygen concentration, temperature, pressure, pH, flow rate of the aqueous solution, hydrogen purity, oxygen purity, demand for a specific gas. It should be noted that each of the dynamic input information can be measured in each cell in the two or more cells, for any group of cells (each group comprising two or more cells) and/or any component of the system as detailed herein and/or to the system as a whole.

As detailed herein, the input information is used to provide output parameters for the operation of the system, denoted herein as operational pattern. The operational pattern refers to any deterministic series of output parameters independently selected for each cell in the two or more cells, for any group of cells (each group comprising two or more cells) and/or to the system as a whole. The output parameters in the operational pattern determine the overall operation of the system. In some embodiments, the operational pattern permits one or more operation cycles of the system.

The operational pattern may comprise at least one of mode selector for each cell in the system and operational parameters selector for each cell and for each mode selected in a specific cell. Non-limiting examples of the operational parameter selector include timing of operation of each cell (starting time of operation), duration of operation (length of operation period measured from the starting time of operation in any time unit) in each one of the cells or temperature of each cell. In some embodiments, the operational pattern comprises, for each cell, or group of cells, at least one of (i) mode selector for each one of the two or more cells in the system (i.e. hydrogen gas generation mode or oxygen gas generation mode), (ii) timing of operation of each cell (starting time of operation) (denoted herein "t"), and (iii) duration of operation (length of operation period measured from the starting time of operation in any time unit) (denoted herein "q") in each one of the cells. As appreciated, the cell bias and optionally the temperature for each one of the two or more cells in the system may determine the hydrogen generation mode and/or oxygen generation mode. The mode selector for each cell determines the mode of operation of each one of the two or more cells in a system. The mode selector may be given in a binary mode, for example 1 for generation of hydrogen (applied bias) and 0 for oxygen generation (absence of bias) or vice versa.

In some embodiments, the operational pattern comprises, for each cell, or group of cells, at least one of (i) a cell bias or applied current for each one of the two or more cells in the system (denoted herein "v" (or "i")), (ii) timing of operation (t) of each one of the two or more cells in the system (starting time of operation), and (iii) duration of operation (q) (length of operation period measured in any time unit) in each one of the two or more cells in the system. As appreciated, the cell bias for each one of the two or more cells in the system may determine the hydrogen generation mode and/or oxygen generation mode.

The combination of the three parameters ((i) through (iii)) noted above allows the system to be operable in one of several modes: (i) a hydrogen operation mode, wherein the operational pattern comprises means permitting generation of hydrogen gas, independently of whether or not oxygen gas is to be produced in the cells; (ii) oxygen operation mode, wherein the operational pattern comprises means permitting generation of oxygen gas, independently of whether or not hydrogen gas is to be produced in the cells; and (iii) a mixed or combined mode wherein both hydrogen and oxygen gases are produced in different cells in parallel or in different cells and in the same cells, in sequence. The number of cells operating in the hydrogen generation mode and the number of cells operating in the oxygen generation mode may determine the overall operation mode of the system, e.g. any one of (i) a hydrogen operation mode (ii) oxygen operation mode and (iii) a mixed or combined mode.

The control unit is configured to operate the system in accordance with an operational pattern that is provided prior to commencement of operation (predetermined operational pattern), during operation (adaptable operational pattern) or at any time point, e.g., upon change in demand or when a malfunction or otherwise a problem in the system operation is encountered.

An exemplary operational pattern may account for any number of cells, for example j number of cells, and accordingly may be presented as a multiparameter matrix of numbers having j rows (number of cells) and i columns representing the number of times each cell within the j cells is operated (defined herein as "operation cycles"). As appreciated, the system described herein comprises two or more cells and thus in its minimal value j is set to be 2, representing two cells.

Each member of the matrix (X) having a combination of parameters (j,i) may be defined by a combination of variables, including: cell bias, timing of operation, and duration of operation. Additional parameters within each member of the matrix may include temperature, pressure, electrolyte concentration, electrolyte flow, circulation steps, flushing steps and others.

Thus, each $X_{ji}$ may be defined by (v,t,q), wherein v stands for the cell bias, t defines the timing of operation (from a predetermined time "0"), and q defines duration of operation (the time length as measured from the time set in "t").

In some embodiments, each $X_{ji}$ may be defined by (v,t,q,T), wherein v stands for the cell bias, t defines the timing of operation, q defines duration of operation, and T defines the temperature. The cell bias, v, of each one of the two or more cells in a system determines the operation mode of each cell. For example, in a cell bias above a threshold bias, for example above 1.23V, hydrogen gas is generated (hydrogen generation mode) and for a cell bias below a threshold value, for example less than 1.23V, oxygen gas is generated (oxygen generation mode). As appreciated, the threshold bias depends on the system properties and arrangement and as such may be adjusted accordingly.

In some embodiments, the operational pattern permits operation of two or more of the cells with the same bias, at the same timing of operation or different timing of operation and for the same or different duration and optionally at same or different temperatures.

In some embodiments, the cell bias may be replaced by or used in combination with an operation mode, w, that may be given in a binary mode, for example 1 for generation of hydrogen (applied bias) and O for oxygen generation (absence of bias) or vice versa.

The time of operation "t" and the duration of operation "q" are each provided by a time unit, optionally according with a predetermined setup. For example, t and q may be independently selected to be in seconds, minutes and hours.

Thus, for a single operation of j cells, the operational pattern may be represented by a jX1 matrix (i.e. a matrix having one column for a single (one) operation), each row represented by at least three numerical entries representing cell bias, timing of operation and duration of operation for each one of the two or more cells. The cell bias as noted herein determines the mode of operation of each one of the cells. The timing of operation and duration of operation may be identically or differently defined for each mode of operation. Similarly, the cell bias, v, or the corresponding binary mode information, w, may be identically or differently for each one of the two or more cells. In the multiparameter matrix, the timing of operation t and the time of duration q are provided as values irrespective of their mode of operation (i.e. hydrogen generation or oxygen generation) however, for the sake of clarity, according with the description herein for the cells operating in a hydrogen generation mode, the timing of operation and the duration of operation are denoted as $(t_n, q_n)$, while for the cells operating in an oxygen generation mode, the timing of operation and the duration of operation are denoted as $(t_m, q_m)$. Each operational pattern may thus be defined by a combination of time points (t and q), for each cell in the j number of cells or groups of cells or for the system as a whole.

In an exemplary system comprising j number of cells, $t_n$ defines an array of time points characterizing the timing of operation of cells operating in a hydrogen generation in each of the cells (e.g. cell bias above a threshold), such that each of $t_{n1}, t_{n2} \ldots t_{nj}$ is independently selected to be essentially the same or different. It should be noted that for the cells in the system that operate in an oxygen generation mode, the respective $t_n$ values for the oxygen generating cells are provided as 0 and vice versa. The term "essentially the same" as used herein encompasses variation in the values of between 1% to 50%.

The system described herein may be operable for generation of hydrogen gas, i.e., in a hydrogen operation mode, independently of whether or not oxygen gas is to be produced in the system.

In some embodiment, the operational pattern allows the system to operate such that at least 1%, 3% 5%, 10%, 15%, 20%, 25%, 40% 35%, 40%, 50%, 60%, 70%, 80%, 90% or each one (100%) of time points $t_{n1}, t_{n2} \ldots t_{nj}$ to be present (e.g. hydrogen gas is generated) and to be essentially the same. In some other embodiment, the operational pattern allows the system to operate such that at least 50%, 60%, 70%, 80%, 90% or each one (100%) of time points $t_{n1}, t_{n2} \ldots t_{nj}$ to be present (e.g. hydrogen gas is generated) and to be essentially the same. Each of duration of operation ($q_n$) is independent selected from each other and may be the same or may be different for each By manipulating each one of the above parameters, the system may be tuned to operate in a discrete mode of hydrogen gas generation or oxygen gas generation or in a continuous mode of hydrogen gas generation. Discrete mode of hydrogen gas generation may be achieved under conditions wherein more than 50% of the two or more cells operate in a hydrogen generation mode. For example, for a system with 4 cells operated once (i.e. the matrix X having dimensions of 4×1), the operational pattern may have the following representation:

$$\begin{pmatrix} 1.48, 3, 100 \\ 1.48, 3, 100 \\ 1.48, 3, 100 \\ 1.48, 3, 100 \end{pmatrix}$$

Such an operational pattern for a threshold value of V=1.23V, will tune the system to operate all four cells in the hydrogen mode simultaneously (v is above the threshold value), starting at t=3 seconds (or minutes or hours) from a time "0" and each cell is operated for a q=100 seconds (or minutes or hours).

In some embodiment, the operational pattern allows the system to operate such that at least 1%, 3% 5%, 10%, 15%, 20%, 25%, 40% 35%, 40%, 50%, 60%, 70%, 80%, 90% or each one (100%) of time points $t_{n1}, t_{n2} \ldots t_{nj}$ to be present (e.g. hydrogen gas is generated) and to be different. In some other embodiment, the operational pattern allows the system to operate such that at least 50%, 60%, 70%, 80%, 90% or each one (100%) of time points $t_{n1}, t_{n2} \ldots t_{nj}$ to be present (e.g. hydrogen gas is generated) and to be different. Each of duration of operation ($q_n$) is independent selected from each other and may be the same or may be different for each other.

It should be noted that the $t_{n1}, t_{n2} \ldots t_{nj}$ and $q_{n1}, q_{n2} \ldots q_{nj}$ are determined (pre-determined or during operation) to allow at least one of the following:

generation of a hydrogen gas starts at the same timing (similar $t_n$) in the two or more cells operating in a hydrogen generation mode and is for the same or different duration in each cell of the two or more cells, or generation of a hydrogen gas starts at different times (different $t_n$) in the two or more cells operating in a hydrogen generation mode and is for the same or different durations in each cell of the two or more cells.

Thus, for example, the two or more cells start at essentially the same $t_n$ and operate for different durations (i.e. different $q_{ns}$).

Alternatively, the two or more cells start at different $t_n$ and operate for same or different durations (i.e. different $q_{ns}$). This option permits the cells operating in a hydrogen generation mode to stop hydrogen generation at the same time, despite starting the hydrogen generation at different timings.

For example, for a system with 3 cells operated once (i.e. the matrix X having dimensions of 3×1), the operational pattern may have the following representation enabling discrete generation of hydrogen gas.

$$\begin{pmatrix} 1.48, 3, 100 \\ 1.48, 7, 96 \\ 1.48, 1, 90 \end{pmatrix}$$

The system described herein may be operable for generation of oxygen gas, i.e. in an oxygen operation mode, independently of whether or not hydrogen gas is to be produced in the system. In some embodiment, the operational pattern allows the system to operate such that at least 1%, 2%, 5%, 10%, 15%, 20%, 25%, 30% 35%, 40%, 50%, 60%, 70%, 80%, 90% or each one (100%) of time points $t_{m1}, t_{m2} \ldots t_{mj}$ to be present (e.g. oxygen gas is generated) and to be essentially the same. In some other embodiment, the operational pattern allows the system to operate such that at least 50%, 60%, 70%, 80%, 90% or each one (100%) of time points $t_{n1}, t_{n2} \ldots t_{nj}$ to be present (e.g. oxygen gas is generated) and to be essentially the same.

In some embodiment, the operational pattern allows the system to operate such that at least 1%, 2%, 5%, 10%, 15%, 20%, 25%, 30% 35%, 40%, 50%, 60%, 70%, 80%, 90% or each one (100%) of time points $t_{m1}, t_{m2} \ldots t_{mj}$ to be present (e.g. oxygen gas is generated) and to be different. In some other embodiment, the operational pattern allows the system to operate such that at least 50%, 60%, 70%, 80%, 90% or each one (100%) of time points $t_{n1}, t_{n2} \ldots t_{nj}$ to be present (e.g. oxygen gas is generated) and to be different.

Each of duration of operation ($q_m$) is independent selected from each other and may be the same or may be different for each $t_m$.

The system described herein may be operable for generation of both hydrogen gas and oxygen gas, simultaneously, i.e. in a hydrogen operation mode and in an oxygen operation mode. For the sake of clarity, it should be noted that each operation mode is simultaneously operated in a different cell(s) from the two or more cells of the system.

In some embodiment, the operational pattern allows the system to operate such that at least 5%, 10%, 15%, 20%, 25%, 30%, 35%, 40%, 50%, 60%, 70%, 80%, 90% or each one (100%) of time points $t_{n1}, t_{n2} \ldots t_{nj}$ be present (e.g. hydrogen gas is generated) and to be essentially the same, whereas the remaining cells, at most 95%, 90%, 85%, 80%, 75%, 70% 65%, 60%, 50%, 40%, 30%, 20%, 10% or none of time points $t_{m1}, t_{m2} \ldots t_{mj}$ to be present (e.g. oxygen gas is generated) and to be essentially the same. Each of duration of operation ($q_n$) is independent selected from each other and may be the same or may be different for each $t_n$. Each of duration of operation ($q_m$) is independent selected from each other and may be the same or may be different for each $t_m$.

In some embodiment, the operational pattern allows the system to operate such that at least 5%, 10%, 15%, 20%, 25%, 30%, 35%, 40%, 50%, 60%, 70%, 80%, 90% or each one (100%) of time points $t_{n1}, t_{n2} \ldots t_{nj}$ be present (e.g. hydrogen gas is generated) and to be different, whereas the remaining cells, at most 95%, 90%, 85%, 80%, 75%, 70% 65%, 60%, 50%, 40%, 30%, 20%, 10% or none of time points $t_{m1}, t_{m2} \ldots t_{mj}$ to be present (e.g. oxygen gas is generated) and to different. Each of duration of operation ($q_n$) is independent selected from each other and may be the same or may be different for each $t_n$. Each of duration of operation ($q_m$) is is independent selected from each other and may be the same or may be different for each $t_m$.

In some embodiment, the operational pattern allows the system to operate such that at least 5%, 10%, 15%, 20%, 25%, 30%, 35%, 40%, 50%, 60%, 70%, 80%, 90% or each one (100%) of time points $t_{n1}, t_{n2} \ldots t_{nj}$ to be present (e.g. hydrogen gas is generated) and to be different, whereas the remaining cells, at most 95%, 90%, 85%, 80%, 75%, 70% 65%, 60%, 50%, 40%, 30%, 20%, 10% or none of time points $t_{m1}, t_{m2} \ldots t_{mj}$ to be present (e.g. oxygen gas is generated) and to different. Each of duration of operation ($q_n$) is selected to be the same for each $t_n$. Each of duration of operation ($q_m$) is selected to be the same for each $t_m$.

In some embodiment, the operational pattern allows the system to operate such that at least 50%, 60%, 70%, 80%, 90% or each one (100%) of time points $t_{n1}, t_{n2} \ldots t_{nj}$ to be present (e.g. hydrogen gas is generated) and to be essentially the same, whereas the remaining cells, at most 50%, 40%, 30%, 20%, 10% or none of time points $t_{m1}, t_{m2} \ldots t_{mj}$ to be present (e.g. oxygen gas is generated) and to be essentially the same. Each of duration of operation ($q_n$) is independent selected from each other and may be the same or may be different for each $t_n$. Each of duration of operation ($q_m$) is independent selected from each other and may be the same or may be different for each $t_m$.

In some embodiment, the operational pattern allows the system to operate such that at least 50%, 60%, 70%, 80%, 90% or each one (100%) of time points $t_{n1}, t_{n2} \ldots t_{nj}$ to be present (e.g. hydrogen gas is generated) and to be different, whereas the remaining cells, at most 50%, 40%, 30%, 20%, 10% or none of time points $t_{m1}, t_{m2} \ldots t_{mj}$ to be present (e.g. oxygen gas is generated) and to be different. Each of duration of operation ($q_n$) is independent selected from each other and may be the same or may be different for each $t_n$. Each of duration of operation ($q_m$) is independent selected from each other and may be the same or may be different for each $t_m$.

In some embodiment, the operational pattern allows the system to operate such that at least 50%, 60%, 70%, 80%, 90% or each one (100%) of time points $t_{n1}, t_{n2} \ldots t_{nj}$ to be present (e.g. hydrogen gas is generated) and to be different, whereas the remaining cells, at most 50%, 40%, 30%, 20%, 10% or none of time points $t_{m1}, t_{m2} \ldots t_{mj}$ to be present (e.g. oxygen gas is generated) and to be different. Each of duration of operation ($q_n$) is selected to be the same for each $t_n$. Each of duration of operation ($q_m$) is selected to be the same for each $t_m$.

In some embodiment, the operational pattern allows the system to operate such that at least 50%, 60%, 70%, 80% or 90% of time points $t_{n1}, t_{n2} \ldots t_{nj}$ to be present (e.g. hydrogen gas is generated) and to be essentially the same, whereas the remaining cells, at most 50%, 40%, 30%, 20% or 10% of time points $t_{m1}, t_{m2} \ldots t_{mj}$ to be present (e.g. oxygen gas is generated) and to be essentially the same. Each of duration of operation ($q_n$) is independent selected from each other and may be the same or may be different for each $t_n$. Each of duration of operation ($q_m$) is independent selected from each other and may be the same or may be different for each $t_m$.

In some embodiment, the operational pattern allows the system to operate such that at least 50%, 60%, 70%, 80% or 90% of time points $t_{n1}, t_{n2} \ldots t_{nj}$ to be present (e.g. hydrogen gas is generated) and to be different, whereas the remaining cells, at most 50%, 40%, 30%, 20% or 10% of time points $t_{m1}, t_{m2} \ldots t_{mj}$ to be present (e.g. oxygen gas is generated) and to be different. Each of duration of operation ($q_n$) is independent selected from each other and may be the same or may be different for each $t_n$. Each of duration of operation ($q_m$) is independent selected from each other and may be the same or may be different for each $t_m$.

In some embodiment, the operational pattern allows the system to operate such that at least 50%, 60%, 70%, 80% or 90% of time points $t_{n1}, t_{n2} \ldots t_{nj}$ to be present (e.g. hydrogen gas is generated) and to be different whereas the remaining cells, at most 50%, 40%, 30%, 20% or 10% of time points $t_{m1}, t_{m2} \ldots t_{mj}$ to be present (e.g. oxygen gas is generated) and to be different. Each of duration of operation ($q_n$) is selected to be the same for each $t_n$. Each of duration of operation ($q_m$) is selected to be the same for each $t_m$.

When referring to time points $t_{n1}, t_{n2} \ldots t_{nj}$ or $t_{m1}, t_{m2} \ldots t_{mj}$ to be essentially the same, it should be understood as that the most later time point starts within the shorted value of duration of time.

For example, for a system with 4 cells operated once (i.e. the matrix X is a one column matrix has dimensions of 4×1), the operational pattern may have the following representation:

$$\begin{pmatrix} 1.48, 3, 100 \\ 1.48, 4, 100 \\ 0.5, 4, 96 \\ 0.5, 3, 100 \end{pmatrix}$$

Such an operational pattern for a threshold value of v=1.23V, will tune the system to operate such that:

Cell 1: generate hydrogen gas (v is above the threshold value), starting at t=3 seconds (or minutes or hours) from a time "0" for a duration of 100 seconds (or minutes or hours);

Cell 2: generate hydrogen gas (v is above the threshold value), starting at t=4 seconds (or minutes or hours) from a time "0" for a duration of 100 seconds (or minutes or hours);

Cell 3: generate oxygen gas (v is below the threshold value), starting at t=4 seconds (or minutes or hours) from a time "0" for a duration of 96 seconds (or minutes or hours);

Cell 4: generate oxygen gas (v is below the threshold value), starting at t=3 seconds (or minutes or hours) from a time "0" for a duration of 100 seconds (or minutes or hours).

The number of times, time point and/or time point $t_m$ is repeated, namely the number of times the process of hydrogen generation and/or oxygen gas is initiated, is referred to herein as an operation cycle (i). The term may be presented as an integer defining the number of times at which a gas is generated in the system.

For simplicity, in a system in which hydrogen gas and oxygen gas are generated simultaneously, operation cycle (i) refers to the number of times time point $t_n$ is repeated. In other words, operation cycle (i) represents the number of times bias is applied allowing generation of hydrogen gas.

The operational pattern permits time point $t_n$ to be repeated i times, namely the system to have i operation cycles.

In some embodiments, the operational pattern may permit each one of the timing of operation $t_{n1} \ldots t_{nj}$ to be for a duration of time $q_n$. Duration may be represented by an array of duration times $q_1 \ldots q_j$ that may be the same or different from any time period between two successive operation cycles. The operational pattern permits each one of duration of operation $q_1 \ldots q_j$ to be independently selected.

In some embodiments, the operational pattern comprises means to allow at least 35%, 40%, 50%, 60%, 70%, 80%, 90% or each one (100%) of duration of operation $q_1 \ldots q_j$ to be the same.

In some embodiments, the operational pattern permits in a similar way each one of the timing of operation $t_{m1}, \ldots t_{mj}$ to be for a duration of time $q_m$.

Continuous generation of hydrogen gas is possible via alternating generations of hydrogen gas and oxygen gas in the same cells at sequential operation cycles. For example, for a system with 4 cells (j=4), operated twice (i=2), the operational pattern may have the following representation of a 4×2 matrix:

$$\begin{pmatrix} 1.48, 3, 100 & 0.5, 105, 100 \\ 1.48, 4, 100 & 0.6, 105, 120 \\ 0.5, 4, 96 & 1.5, 104, 150 \\ 0.5, 3, 100 & 1.5, 104, 100 \end{pmatrix}$$

In the exemplary option above, an operational pattern for a threshold value of v=1.23V, will tune the system to operate as follow:

First Operation Cycle (i=1):
  Cell 1: generate hydrogen gas (v is above the threshold value), starting at t=3 seconds (or minutes or hours) from a time "0" for a duration of 100 seconds (or minutes or hours);
  Cell 2: generate hydrogen gas (v is above the threshold value), starting at t=4 seconds (or minutes or hours) from a time "0" for a duration of 100 seconds (or minutes or hours);
  Cell 3: generate oxygen gas (v is below the threshold value), starting at t=4 seconds (or minutes or hours) from a time "0" for a duration of 96 seconds (or minutes or hours);
  Cell 4: generate oxygen gas (v is below the threshold value), starting at t=3 seconds (or minutes or hours) from a time "0" for a duration of 100 seconds (or minutes or hours);
  Second Operation Cycle (i=2):
  Cell 1: generate oxygen gas (v is below the threshold value), starting at t=105 seconds (or minutes or hours) from a time "0" for a duration of 100 seconds (or minutes or hours); during this generation, the anode is regenerated;
  Cell 2: generate oxygen gas (v is below the threshold value), starting at t=105 seconds (or minutes or hours) from a time "0" for a duration of 120 seconds (or minutes or hours); during this generation, the anode is regenerated;
  Cell 3: generate hydrogen gas (v is above the threshold value), starting at t=104 seconds (or minutes or hours) from a time "0" for a duration of 150 seconds (or minutes or hours);
  Cell 4: generate hydrogen gas (v is above the threshold value), starting at t=104 seconds (or minutes or hours) from a time "0" for a duration of 100 seconds (or minutes or hours).

As appreciated, such an operational pattern may be repeated many times with any change permitted.

In cases the operation is repeated again in an identical manner, such an operation can be repeated for I times.

During continuous generation of hydrogen gas, at least some of the cells operating in a hydrogen generation mode in i=1 are regenerated in i=2 to allow generation of hydrogen gas in i=3 are regenerated in i=4 and so on.

In some embodiments, in which the operation in i=3 is identical to the operation in i=1 and the operation in i=4 is identical to the operation in i=2, 1=2.

As such and in accordance with some embodiments, during continuous generating of hydrogen gas, optimal operation of the system is obtained in case the number of hydrogen generating cells is at least as the number of oxygen generating cells.

In some embodiments, the continuous mode comprises in a first operation cycle generation of hydrogen gas in at least one of the at least two cells in parallel to generation of oxygen gas in at least a different cell of the at least two cells and in a second operation cycle generation of hydrogen gas in at least one of the at least two cells, at which oxygen gas was generated in the first operation cycle in parallel to generation of oxygen gas in at least a cell of the at least two cells at which hydrogen gas was generated in the first operation cycle.

An embodiment of the system described herein is shown in FIG. 2. A system (20) comprises, in this particular embodiment, two E-TAC cells (30, 40), but may comprise more than two such cells. The system further comprises a pipe assembly (50), at least one liquid reservoir for holding an aqueous solution (60), which may be common to the system as a whole, and may feed the solution into the liquid-gas separators (70) and (80). The liquid-gas separators (70) and (80) provides distinct electrolyte reservoirs which contains either hydrogen or oxygen gas. The liquid-gas separators (70) and (80) feed or receive a solution from the cells, in accordance with the operational mode. Liquid-gas separators (70) and (80) are provided such that the evolved gases are separated from the aqueous medium and delivered to the gas reservoirs (not shown). The control unit (10) associated with the system is exemplary described in FIG. 1. Each one of the two cells (30, 40) comprises at least one inlet (32, 34 and 42, 44) and at least one outlet (36, 38 and 46, 48, respectively).

In addition, to the liquid-gas separators (70) and (80), the system described herein may comprise an additional separator. FIG. 2B shows an example of the system described herein comprising an additional de-mixing separator (190). A system (120) comprises, in this particular embodiment, two E-TAC cells (130, 140), but may comprise more than two such cells, a pipe assembly (500) and liquid-gas separators (170) and (180) as described in connection with FIG. 2A. The pipe assembly (500, shown in FIG. 2B) is contains three distinct piping sub-assemblies (501,502,503), each connected to the liquid-gas separators (170, 180, 190). The system according with this embodiments comprises a de-mixing separator (190). The liquid-gas separators (170, 180, 190) provide distinct electrolyte reservoirs which contain either oxygen (170), hydrogen (180) or small residues of both (190). The electrolyte temperature is maintained below 60° C. for the hydrogen liquid-gas separator (180) or above 60° C. for the oxygen liquid-gas separator. The de-mixing separator (190) is maintained at a temperature of between 40° C. to 70° C. It is suggested that such a temperature is relatively cold and thus capable at least one of (i) preventing hydrogen and oxygen mixture by fleshing the two or more cells between generation of hydrogen gas and generation of oxygen gas, (ii) terminating generation of oxygen gas before the electrolytes required for hydrogen gas generation are transferred into the cell and (iii) provide heat storage that reduce switching heat losses.

The control unit (10) associated with the system is exemplary described in FIG. 1. Each one of the two cells (130, 140) comprises at least one inlet (132 and 142) and at least one outlet (136 and 146, respectively).

As described herein, each one of the two or more cells include an electrode assembly comprising an anode electrode and a cathode electrode that may have any shape or may be configured into specific shapes and structures.

As described herein, each one of the two or more cells may be designed to provide bias (voltage, power) for generation of hydrogen gas and to allow electrolyte required for gas generation to flow to the electrode assembly. In some embodiments, the voltage may be transmitted to the electrode assembly though connections at either side/end of the cell. FIG. 2C shows an example of an ETAC cell (200) comprises an anode electrode (220) and a cathode electrode (240) connection in the top end or bottom end.

In some embodiments, at least one of the anode electrode or the cathode electrode have a flat shape and assembled together. FIGS. 2D and 2E show an example of an electrode assembly with the anode electrodes connected to the top contact and the cathode electrodes connected to the bottom contact or vice versa.

In some embodiments, at least one of the anode electrode or the cathode electrode are assembled into rolled electrodes and the electrode assembly include an anode electrode, a cathode electrode and optionally at least one non-conductive separator being rolled together. FIG. 2F shows an example of rolled electrode assembly within a cell.

The system according to embodiments of the invention comprises two E-TAC cells or more, each cell is configured for holding an aqueous solution and comprises at least one inlet, at least one outlet, a pipe assembly comprising liquid communication channels, pipes, configured for allowing flow of the aqueous solution from a the oxygen liquid gas separator/liquid reservoir, configured for holding a hot electrolyte, into each one of the E-TAC cells; and liquid communication channels, pipes, for allowing flow of the aqueous solution from a hydrogen liquid gas separator/liquid reservoir, configured for holding a cold electrolyte, into the E-TAC cells. Also may be included are gas communication channels, pipes, configured for allowing flow of hydrogen gas from the hydrogen liquid gas separator and/or each one of the E-TAC cells into a gas reservoir for holding hydrogen gas, and gas communication channels, pipes, configured for allowing flow of oxygen gas from the oxygen liquid gas separator and/or each one of the E-TAC cells into a gas reservoir for holding oxygen gas.

*The flow into and out of each of the two or more cells (including for example direction of flow and flow rate (velocity)) is collectively denoted herein as circulation pattern.

The at least one inlet and at least one outlet configured to allow circulation of the aqueous solution and of the gas in the system. The flow into and out of each of the two or more cells (including for example direction of flow and flow rate (velocity)) is collectively denoted herein as circulation pattern.

In some embodiments, the at least one inlet is for receiving an aqueous solution into the two or more cells and at least one outlet for evacuating an aqueous solution and/or a gas from the two or more cells.

The aqueous solution is any aqueous solution suitable for use in electrolysis of water. In some embodiments, the aqueous solution, being an electrolyte solution, comprises a metal electrolyte. In some embodiments, the electrolyte is selected from Li, Na, K, Rb, Cs, Ca, Sr or Ba, or a salt or a hydroxide thereof. In some embodiments, the metal is an alkali metal. In some embodiments, the electrolyte comprises a metal hydroxide. In some embodiments, the metal hydroxide is NaOH or KOH. In some embodiments, the metal hydroxide electrolyte is KOH. In some embodiments, the aqueous solution is carbonate-bicarbonate buffer electrolyte, In some embodiments, the aqueous solution is characterized by a pH above 7, optionally at least 8, optionally at least 9, optionally at least 10, optionally at least 11, optionally at least 12, optionally at least 13, and optionally at least 14. In some embodiments, the aqueous solution is an acidic solution.

In some embodiments, the circulation pattern may be the flow of an aqueous solution into each one of the two or more compartments. In some embodiments, the circulation pattern may be the flow of a gas from each one of the two or more compartments. As appreciated, the circulation pattern is defined independently for each one of the cells in the two or more cells. In some embodiments, a circulation pattern permits circulation of hot electrolyte into at least one cell of the two or more cells to increase oxygen generation.

In accordance with some aspects, the present invention provides a method of generating hydrogen gas, the method comprising:

in a system comprising two or more electrochemical thermally activated cells (E-TAC cells), each cell containing an aqueous solution and each comprising an electrode assembly having a cathode electrode and an anode electrode, applying an electric bias in at least two of said two or more cells at a first time point to affect reduction of water and to generate hydrogen gas; and applying an electric bias at a different time point in at least another cell of said two or more cells to affect reduction of water and generate hydrogen gas, wherein the method is operable in accordance with a predetermined operational pattern.

In accordance with some embodiments, the different time point is earlier to, later to or the same as the first time point.

In some embodiments, the method comprising continuous generation of hydrogen.

In accordance with some other aspects, the present invention provides a method of generating hydrogen gas and/or oxygen gas, the method comprising:

in a system comprising two or more electrochemical thermally activated cells (E-TAC cells), each cell containing an aqueous solution and each comprising an electrode assembly having a cathode electrode and an anode electrode, applying electrical bias to at least two of the two or more cells to generate hydrogen gas therein;

discontinuing bias in one or more of the two or more cells to induce generation of oxygen gas, wherein the method is operable in accordance with a predetermined operational pattern.

In some embodiments, the method comprises:

applying an electric bias in at least one of said two or more cells at a first time point to affect reduction of water and to generate hydrogen gas;

discontinuing bias at a second time in said one of said two or more cells to reversibly oxidize the anode electrode to generate oxygen gas while applying at the second time an electric bias in at least another one of said two or more cells to affect reduction of water and generate hydrogen gas, while the second time point is later than the first time point.

In some embodiments, the method comprising at least two operation cycles, each operation cycle comprises generation of hydrogen gas and of oxygen gas, each gas generated in different cells.

In some embodiments, the method further comprises, discontinuing bias at a third time in said at least another one of said two or more cells to reversibly oxidize the anode electrode to generate oxygen gas while applying at the third time an electric bias in said one of said two or more cells to affect reduction of water and generate hydrogen gas, while the third time point is later than the second time point; wherein each of the cells is configured to operate in accordance with a predetermined operational pattern, to permit generation of hydrogen gas and/or oxygen gas.

In accordance with some other aspects, the present invention provides a method of generating hydrogen gas and/or oxygen gas, the method comprising:

in a system comprising j E-TAC cells, each containing an aqueous solution and each comprising an electrode assembly having a cathode electrode and an anode electrode, applying electrical bias to at least 5%, 10%, 15%, 20%, 25%, 40% 35%, 40%, 50%, 60%, 70%, 80%, 90% or 100% of the j cells to thereby generate hydrogen gas therein, wherein the method is operable in accordance with a predetermined operational pattern.

In accordance with some embodiments, the method comprises applying an electric bias (cell bias) in at least 5%, 10%, 15%, 20%, 25%, 40% 35%, 40%, 50%, 60%, 70%, 80%, 90% or 100% of j cells, at essentially the same time points (timing of operation), $t_{n1}, t_{n2} \ldots t_{nj}$ to affect reduction of water and generate hydrogen gas, for a duration of time $q_{n1}, q_{n2} \ldots q_{nj}$.

In accordance with some embodiments, the method comprises applying an electric bias (cell bias) in at least 5%, 10%, 15%, 20%, 25%, 40% 35%, 40%, 50%, 60%, 70%, 80%, 90% or 100% of j cells, at different time points (timing of operation), $t_{n1}, t_{n2} \ldots t_{nj}$ to affect reduction of water and generate hydrogen gas, for a duration of time $q_{n1}, q_{n2} \ldots q_{nj}$.

In accordance with such embodiments, the method comprises application of bias in at least 35%, 40%, 50%, 60%, 70%, 80%, 90% or in each one (100%) of the j cells, at essentially the same time points (timing of operation), $t_{n1}, t_{n2} \ldots t_{nj}$ to affect reduction to water and generate hydrogen gas, for a duration of time $q_{n1}, q_{n2} \ldots q_{nj}$ to generate hydrogen gas.

In accordance with such embodiments, the method comprises application of bias in at least 35%, 40%, 50%, 60%, 70%, 80%, 90% or in each one (100%) of the j cells, at different time points (timing of operation), $t_{n1}, t_{n2} \ldots t_{nj}$ to affect reduction of water and generate hydrogen gas, for a similar or different duration of time $q_{n1}, q_{n2} \ldots q_{nj}$ to generate hydrogen gas.

In accordance with such embodiments, the method comprises application of bias in at least 50%, 60%, 70%, 80%, 90% or in each one (100%) of the j cells, at essentially the same time points (timing of operation), $t_{n1}, t_{n2} \ldots t_{nj}$ to affect reduction of water and generate hydrogen gas, for a duration of time $q_{n1}, q_{n2} \ldots q_{nj}$ to generate hydrogen gas.

In accordance with such embodiments, the method comprises application of bias in at least 50%, 60%, 70%, 80%, 90% or in each one (100%) of the j cells, at different time points (timing of operation), $t_{n1}, t_{n2} \ldots t_{nj}$ to affect reduction of water and generate hydrogen gas, for a duration of time $q_{n1}, q_{n2} \ldots q_{nj}$ to generate hydrogen gas.

In some embodiments, the duration of time may be the same for each one of $q_{n1}, q_{n2} \ldots q_{nj}$. In some other embodiments, the duration of time may be independently selected to be different for each one of $q_{n1}, q_{n2} \ldots q_{nj}$.

In some embodiments, the method comprises discontinuing or applying an electric bias below a predetermined threshold in at least 5%, 10%, 15%, 20%, 25%, 40% 35%, 40%, 50%, 60%, 70%, 80%, 90% or 100% of j cells at a time point (timing of operation), $t_{m1}, t_{m2} \ldots t_{mj}$ such that oxygen is generated for a duration of time $q_{m1}, q_{m2} \ldots q_{mj}$.

In some embodiments, the timing of operation $t_{m1}, t_{m2} \ldots t_{mj}$ may be the same or may be different for each $t_m$. In some embodiments, the duration of time $q_{m1}, q_{m2} \ldots q_{mj}$ may be the same or may be different for each $q_m$.

In some embodiments, the method comprises application of bias in 50% of the j cells, at essentially the same time points (timing of operation), $t_{n1}, t_{n2} \ldots t_{nj}$ to affect reduction of water and generate hydrogen gas, for a duration of time $q_{n1}, q_{n2} \ldots q_{nj}$ to generate hydrogen gas in parallel to discontinuing or applying an electric bias below a predetermined threshold in 50%, of j cells at a time point (timing of operation), $t_{m1}, t_{m2} \ldots t_{mj}$ such that oxygen is generated for a duration of time $q_{m1}, q_{m2} \ldots q_{mj}$ wherein time point $t_{n1}, t_{n2} \ldots t_{nj}$ if present and time point $t_{m1}, t_{m2} \ldots t_{mj}$ if present are essentially the same. In some embodiments, the method comprises applying heat to the at least 50% of j cells at which bias below a threshold value is applied in a time point $t_{m1}, t_{m2} \ldots t_{mj}$ to allow generation of oxygen gas.

In some embodiments, the method comprising operating the system for i operation cycles; comprising applying during operation cycle 1 a bias above a threshold value in at least 50% of j cells a time point $t_{n1}, t_{n2} \ldots t_{nj}$, at which hydrogen gas is generated for a duration $q_{n1}, q_{n2} \ldots q_{nj}$; and applying a bias below a threshold value or discontinuing the bias in at least 50% of j cells a time point $t_{m1}, t_{m2} \ldots t_{mj}$ for a duration $q_{m1}, q_{m2} \ldots q_{mj}$ at which oxygen gas is generated, wherein time point $t_{n1}, t_{n2} \ldots t_{nj}$ if present and time point $t_{m1}, t_{m2} \ldots t_{mj}$ if present are essentially the same. In some embodiments, the method comprising applying during operation cycle 2 a bias above a threshold value in at least 50% of j cells a time point $t_{n1}, t_{n2} \ldots t_{nj}$, at which hydrogen gas is generated for a duration $q_{n1}, q_{n2} \ldots q_{nj}$; and applying a bias below a threshold value in at least 50% of j cells a time point $t_{m1}, t_{m2} \ldots t_{mj}$ for a duration $q_{m1}, q_{m2} \ldots q_{mj}$ at which oxygen gas is generated, wherein time point $t_{n1}, t_{n2} \ldots t_{nj}$ if present and time point $t_{m1}, t_{m2} \ldots t_{mj}$ if present are essentially the same, such that application of a bias above a threshold value is applied in cycle 2 in cells at which a bias below a threshold value was applied at cycle 1.

In some embodiments, the method comprising heating the at least 50% of j cells at which bias below a threshold value is applied in any of time point $t_{m1}, t_{m2} \ldots t_{mj}$ to allow generation of oxygen gas.

In some embodiments, the method comprises repeating the sequence several times, continuously, without interruption.

In some embodiments, the method for generation hydrogen gas comprises:
  Circulating cold electrolyte solution,
  Applying an electric bias in at least one of the two or more cells to thereby generate hydrogen,
  closing the applied bias and circulating cold electrolyte without bias,
  Stop cold electrolyte circulation.

In some embodiments, the method for generation of oxygen gas comprises:
  Circulating hot electrolyte solution in the absence of applied bias,
  Stop hot electrolyte circulation.

In accordance with some embodiments, the method further comprises a de-mixing step that is carried out after discontinuing bias.

In some embodiments, the de-mixing step comprises flowing an electrolyte solution or water into one of the two or more cells. In some embodiments, the method comprises flowing of hot and/or cold electrolyte solutions into one of the two or more cells followed by flowing of an inert gas (such as nitrogen).

In some embodiments, the de-mixing step comprises flowing of water in order to flush the electrolysis cells.

In some embodiments, the de-mixing step follows generation of hydrogen gas and comprises:
  Circulation of the electrolyte to the cold reservoir,
  optionally, allowing nitrogen venting,
  circulation of a hot electrolyte form the hot reservoir.

In some embodiments, the de-mixing step follows generation of oxygen gas and comprises:
  circulation of the electrolyte to the hot reservoir
  optionally, allowing nitrogen venting,
  circulation of a cold electrolyte form the cold reservoir.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Non-Limiting Examples

Example 1

Electric Power Consumption

This experiment was aimed at measuring the energy consumption of the E-TAC system.

Figure 1:
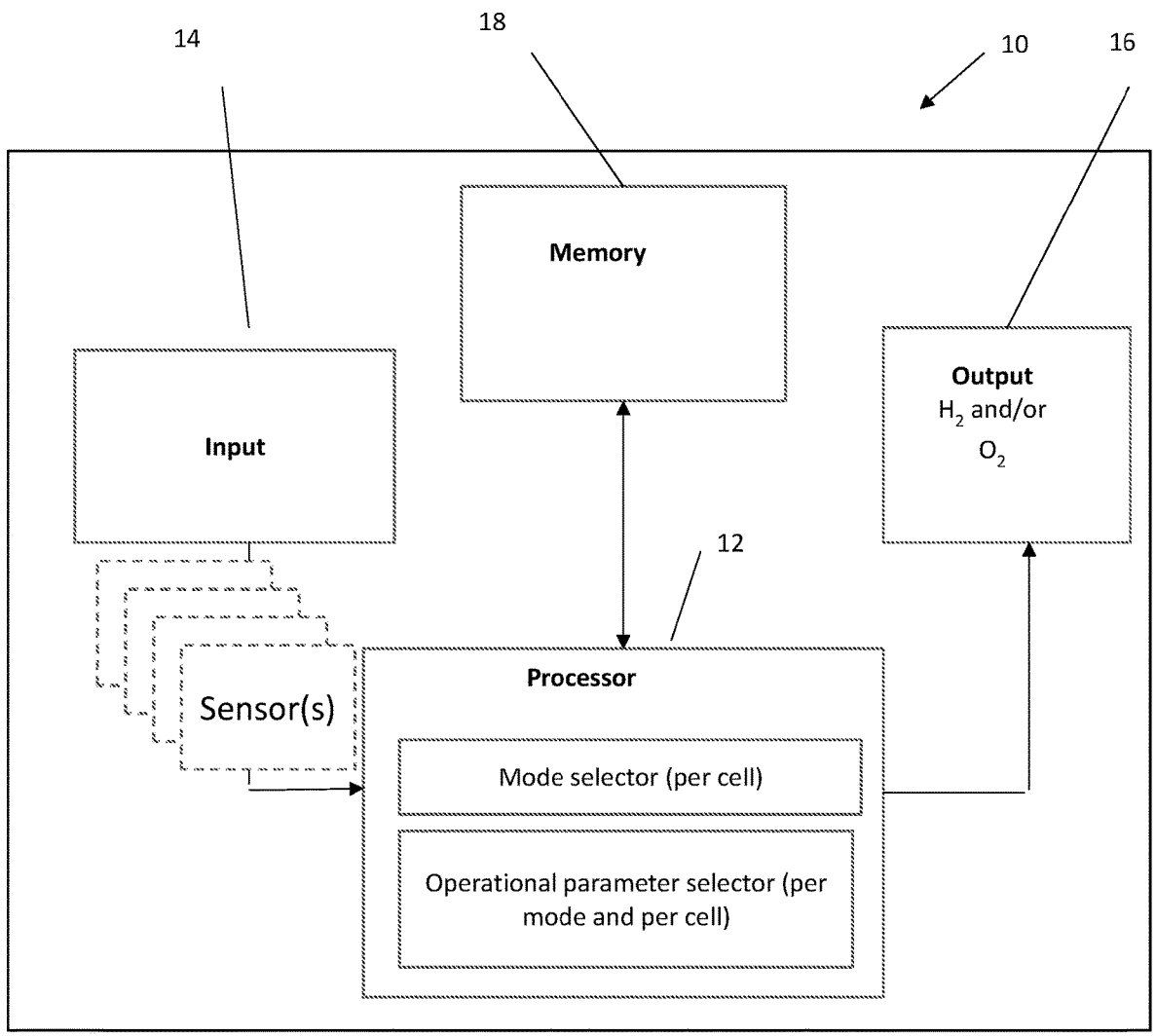
FIG. 1 is a schematic representation of a control unit of the system described herein comprising an input data, output data, a memory and a processor.
Figure 2A:
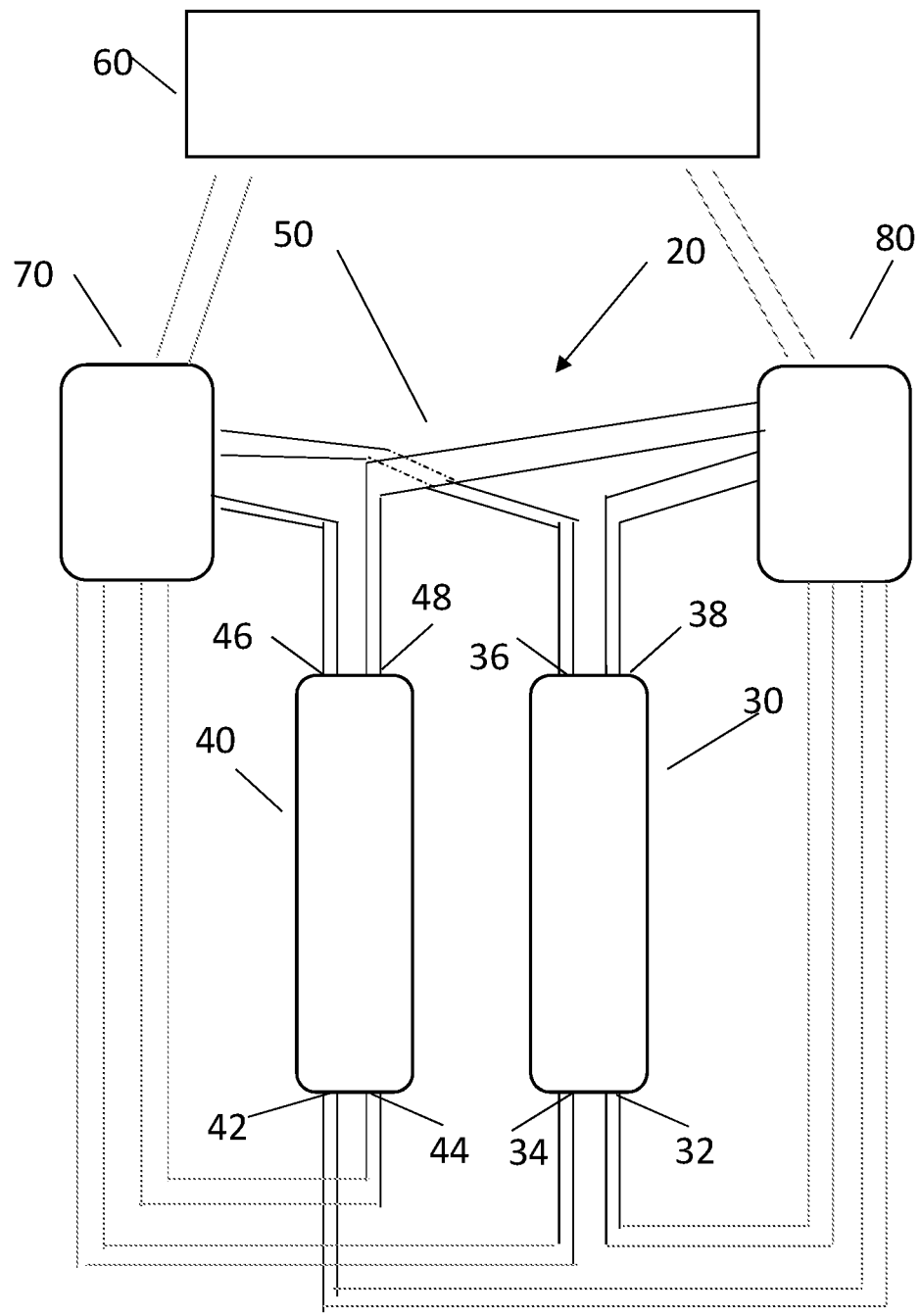
FIGS. 2A to 2F are schematic representations of exemplary embodiments of a system described herein (FIGS. 2A and 2B) and various components of the system; E-TAC (FIG. 2C) and electrode assembly (FIG. 2D to 2F)
Figure 2B:
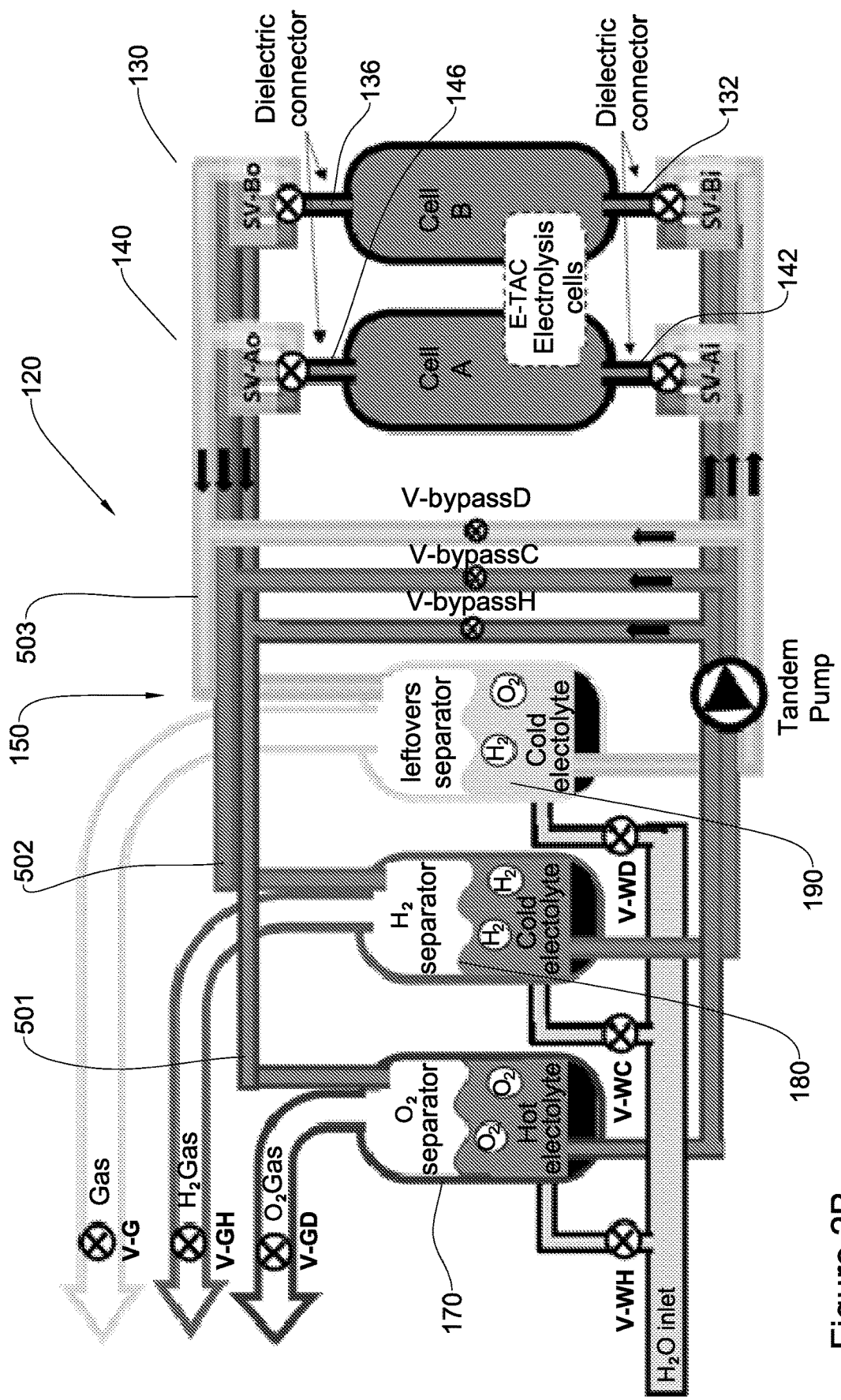
Figure 2C:
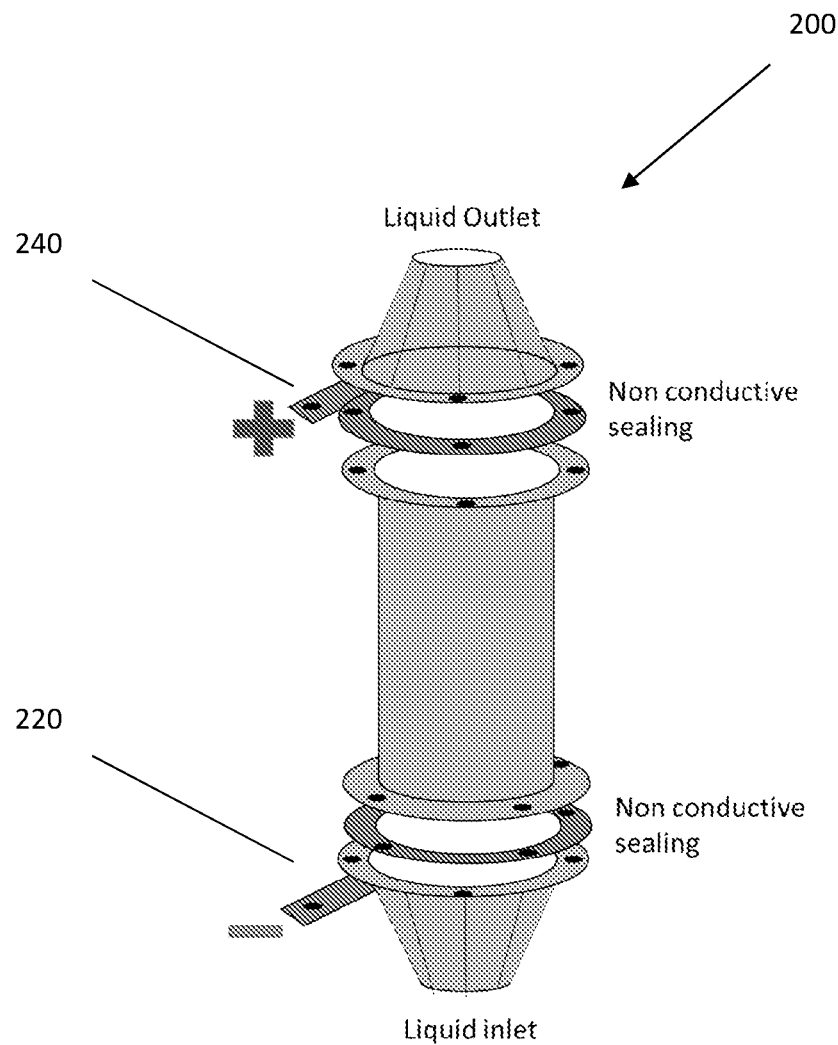
Figure 2D:
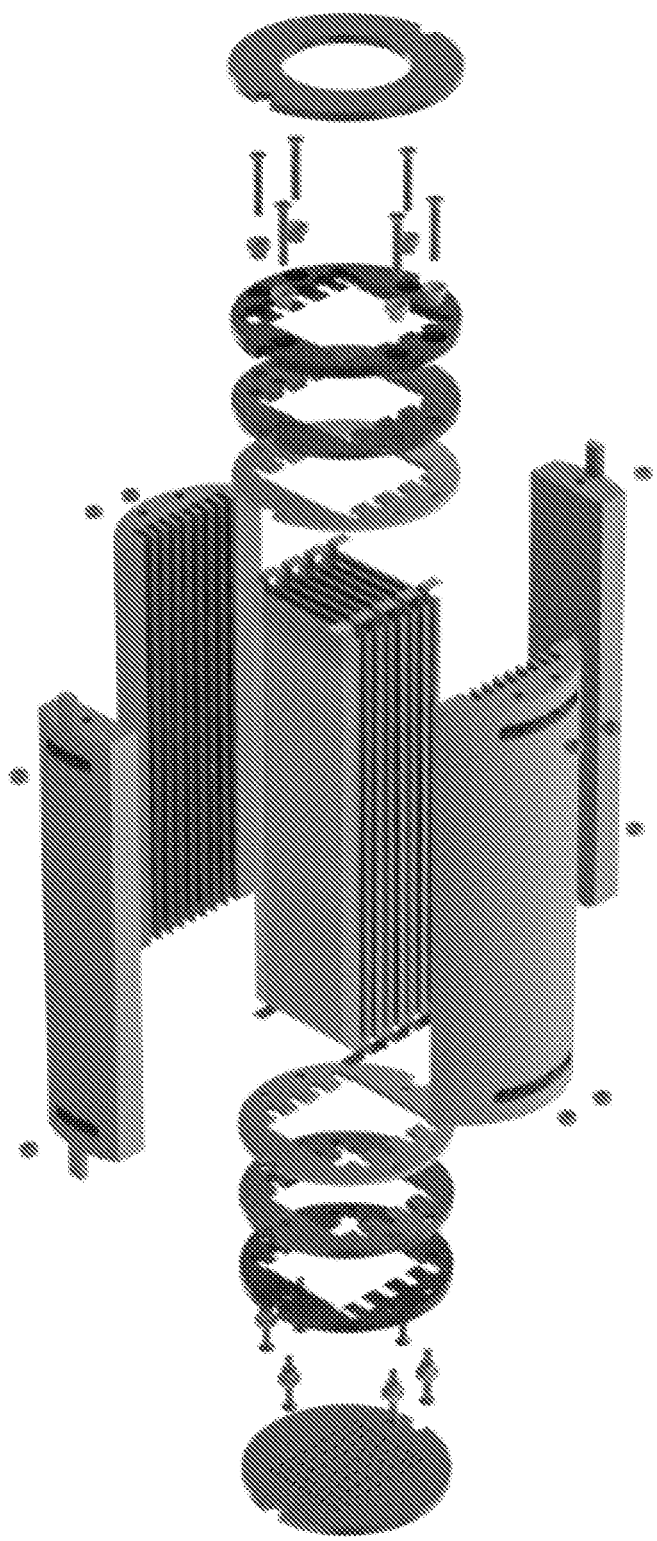
Figure 2E:
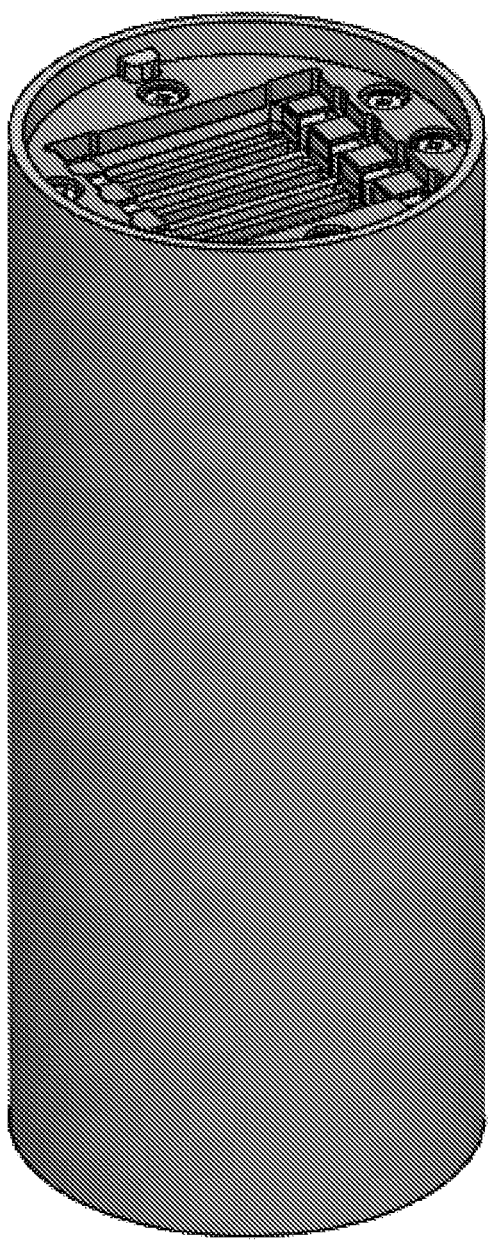
Figure 2F:
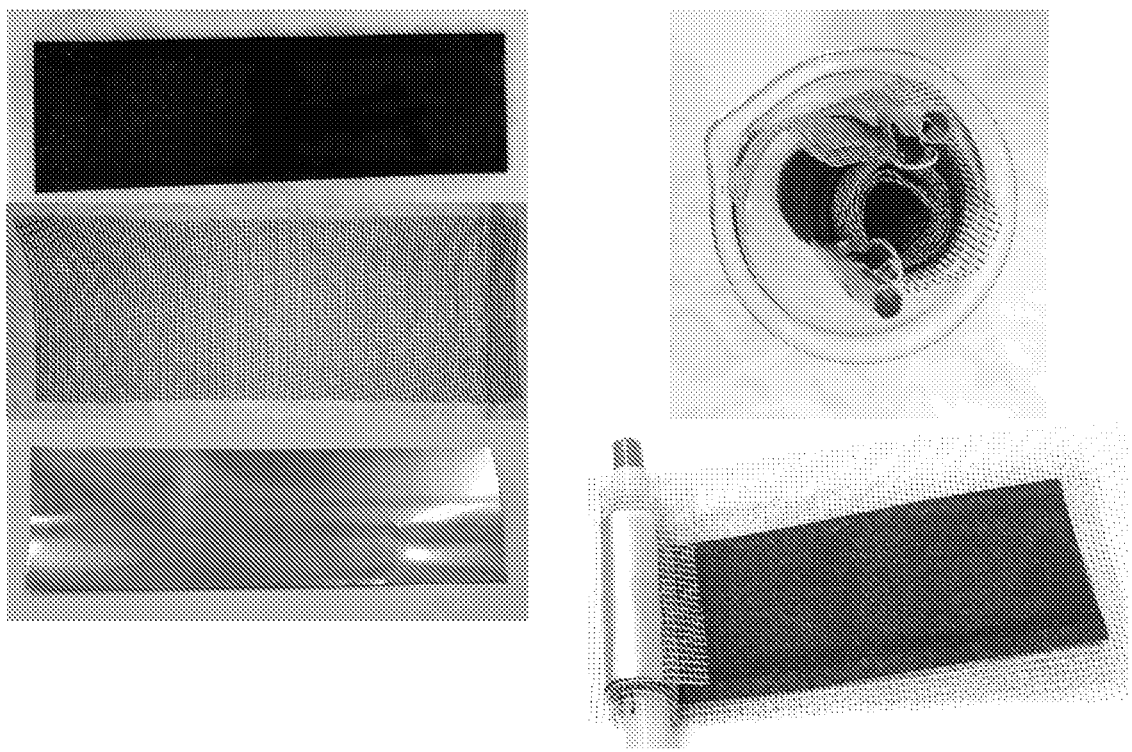
Figure 3:
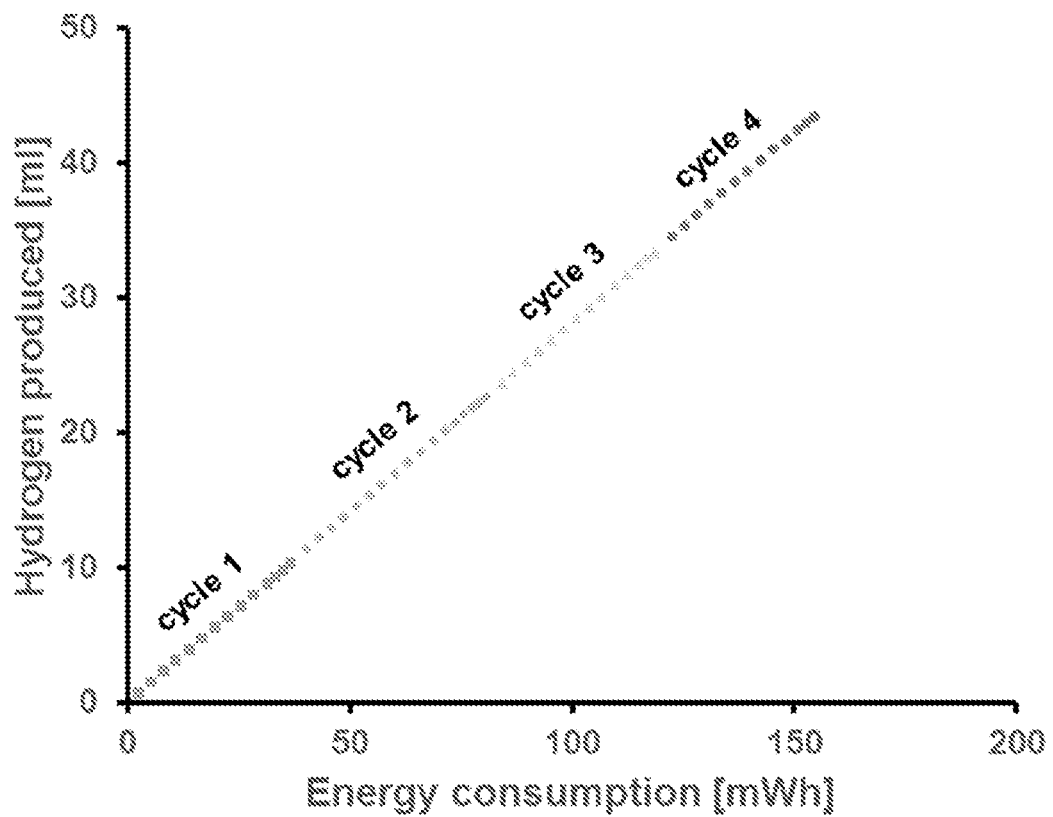
FIG. 3 is a graph showing the low energy consumption of the E-TAC system disclosed herein.

The experiment included a sequence of four E-TAC cycles. During each cycle hydrogen is produced electrochemically while consuming electrical energy supplied by the potentiostat, as presented in FIG. 3.

During four E-TAC cycles 43.4 ml of pure hydrogen was produced while consuming only 154.3 mWh (equivalent to 39.5 kWh/kg (3.55 kWh/Nm$^3$)). The electrical power consumption is the product of the applied voltage and current. The hydrogen produced is calculated according to the charge transferred during each cycle and to the hydrogen electrochemical reaction (HER):

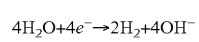

This experiment demonstrate the low energy (by electric power) consumption of a E-TAC based electrolysis system.

Example 2

Heat Balance of the E-TAC Process

The table below summarizes the thermodynamic properties of the E-TAC process (Macdonald & Challingsworth, n.d.; Silverman, 1981):

| Reaction | | $\Delta G$ (kJ/mol$_{Hydrogen}$) [voltage (V)] | $\Delta H$ (kJ/mol$_{Hydrogen}$) [voltage (V)] |
|---|---|---|---|
| Step 1: electrochemical hydrogen evolution | $2Ni(OH)_2 \rightarrow$ $2NiOOH + H_2$ | 274.7 [1.42] | 301.1 [1.56] |
| Step 2: chemical oxygen evolution | $2NiOOH + H_2O \rightarrow$ $2Ni(OH)_2 + \frac{1}{2}O_2$ | −37.6 | −15.3 |
| Total: water splitting | $H_2O \rightarrow$ $H_2 + \frac{1}{2}O_2$ | 237.2 [1.23] | 285.8 [1.48] |

According to the thermodynamic data presented in table, the electrochemical hydrogen evolution reaction is non-spontaneous, and absorbs heat from the environment for cell voltage below 1.56 V. On the other hand, the chemical oxygen evolution reaction is spontaneous and exothermic, releasing heat to its environment. Thus (considering only the reaction thermodynamics), for the low-temperature hydrogen evolution phase, the cell temperature will decrease with operation if the cell voltage does not surpass 1.56 V, and for the high-temperature oxygen evolution phase, the cell temperature will increase due to the exothermic reaction.

Step 1: Electrochemical Hydrogen Production

The total energy requirement for the hydrogen generation phase is given by $\Delta H = \Delta G + T\Delta S$, where $\Delta H$ is the enthalpy of reaction, $\Delta G$ is the Gibbs free energy or electricity requirement, and $T\Delta S = \Delta Q_{in}$ is the heat requirement at a constant temperature T. The heat requirement equal to T$\Delta$S may be supplied electrically, in which case the cell operation is adiabatic. Therefore, adiabatic conditions for the hydrogen generation phase are achieved at Vcell=1.56V. Below 1.56V the system is endothermic, absorbing heat from the environment, and effectively cooling the system. To keep the cell at room temperature, heat must be supplied according to:

$$\Delta Q = \Delta H - P_{electricity} =$$
$$(1.56 - V_{cell})(V) \times 2\left(\frac{mol\ e^-}{mol\ H_2}\right) \times 96485\left(\frac{C}{mol}\right) \times 1\left(\frac{J}{C \times V}\right) \times 10^{-3}\left(\frac{kJ}{J}\right)$$
$$\Delta Q = (1.56 - V_{cell}(V)) \times 192.97\left(\frac{kJ}{mol\ Hydrogen}\right)$$
$$\Delta Q @ 1.48V =$$
$$(1.56 - 1.48) \times 192.97\left(\frac{kJ}{mol\ Hydrogen}\right) = 15.4\left(\frac{kJ}{mol\ Hydrogen}\right)$$

Step 2: Chemical Oxygen Production

The oxygen generation phase is exothermic, releasing heat to the environment.

$$\Delta Q = \Delta H = -15.3 \left( \frac{kJ}{mol\ Hydrogen} \right)$$

Although, the water and nickel oxyhydroxide must be heated from room temperature to the process temperature (at least 60° C.) the heat released is equal to the calculated at 25° C.

Following the regeneration reaction, oxygen is released from the cell, cooling back to room temperature, and the nickel hydroxide is placed back in a cold electrolyte for hydrogen production. Therefore, the sum of the enthalpy changes equals the regeneration reaction enthalpy change at 25° C., $\Delta H°rxn = -15.3$ kJ/mol $H_2$.

The released heat by the exothermic oxygen generation is equal to the heat needed by the endothermic hydrogen production at $V_{cell} = 1.48V$. This result is that 1.48V is the thermo-neutral voltage for water splitting.

In addition to the chemical reaction heating one should also consider the heating of the water supply (water is consumed during oxygen production). To estimate the heat required for heating the water supply to 90° C. (to promote oxygen generation) the following measures were taken:

1. The water were heated from room temperature (25 C) to 90 C.
2. The E-TAC cell was isolated—adiabatic process.

It was assumed that all the heat stored in the water consumed by the reaction is lost as it escapes with the $O_2$. This lost heat can be reused by adding an heat exchanger to capture heat from the escaping oxygen gas.

In order to produce 1 mole of hydrogen, 1 mole of water is heated from 25 C to 90° C.

$$C_p(water, K) = 52.928 + 47.614 \cdot 10^{-3} \cdot T - 7.238 \cdot 10^5 \cdot T^{-2} \left(\frac{J}{mol}\right)$$

$$Q = m \int_{298}^{373} C_p dt = 4.03 \left( \frac{kJ}{mol\ Hydrogen} \right)$$

All $C_p$ data used in this calculation were described by Macdonald, Digby D (1993).

Macdonald, Digby D., and Mark L. Challingsworth. "Thermodynamics of Nickel-Cadmium and Nickel-Hydrogen Batteries." Journal of the Electrochemical Society 140.3 (1993): 606-609.

Switching Between Oxygen and Hydrogen Production Steps

In addition to the heat consumed and released by the chemical reactions, the heating and cooling of the E-TAC cell, should also be considered.

To estimate the heating and cooling of the E-TAC cell during switching between hydrogen and oxygen production step the following measures were taken:

1. the cell was cooled or heated from room temperature (25° C.) to 90° C.
2. The E-TAC cell was isolated—adiabatic process. Therefore, only the electrodes change their temperature.
3. The anode and cathode substrate was nickel foam.
4. The anode is 1:2 molar ration of nickel foam to $NiOH_2$. The electrodes fabricated so far has as 1:1 ratio, but 1:2 ratio is preferred and within reach.

In order to produce 1 mole of hydrogen, 2 mole of $Ni(OH)_2$ is needed. Therefore in the anode and cathode together 2 mole of nickel and 2 mole of $Ni(OH)_2$ were heated and cooled during switching.

$$C_p(Ni, K) = 26.07 \left(\frac{J}{mol}\right); C_p(Ni(OH)_2, K) = 92.33 \left(\frac{J}{mol}\right)$$

$$Q = m \int_{298}^{373} C_p dT = 2 \cdot 26.07 \cdot 65 + 2 \cdot 92.33 \cdot 65 = 15.4 \left(\frac{kJ}{mol\ Hydrogen}\right)$$

All $C_p$ data used in this calculation were described by Macdonald, Digby D (1993).

Overall E-TAC Cycle

Considering both the reactions thermodynamics and the water and electrodes heating and cooling, it have been found that:

During hydrogen production the reaction consumes $$15.4 \left( \frac{kJ}{mol\ Hydrogen} \right)$$

and cooling down the electrodes from 90° C. to 25° C. release about $$15.4 \left( \frac{kJ}{mol\ Hydrogen} \right).$$

Therefore, hydrogen production is expected to be thermo-neutral. Nevertheless, under practical conditions this step might require some heating or cooling which can be easily achieved by slight changes in the operating voltage or some air-cooling.

During oxygen production the reaction releases $$15.3 \left( \frac{kJ}{mol\ Hydrogen} \right)$$

and heating up the electrodes and water supply from 90° C. to 25° C. consumes $$4.1 \left( \frac{kJ}{mol\ Hydrogen} \right).$$

Therefore, some heating is required to provide the excess $$4.1 \left( \frac{kJ}{mol\ Hydrogen} \right)$$

which is only 1.4% of the 284 kJ stored in the mole hydrogen produced.

The invention claimed is:

1. An electrochemical system for generating hydrogen gas and/or oxygen gas, the system comprising:
   two or more electrochemical thermally activated chemical (ETAC) cells, wherein at least two of said two or more cells are non-partitioned cells, each cell configured for holding an aqueous solution and comprising at least one electrode assembly, each having a cathode electrode and an anode electrode, said two or more ETAC cells being configured to generate hydrogen gas in the presence of electrical bias, and generate oxygen gas in the absence of bias, and a control unit configured to operate the two or more cells in a continuous hydrogen generation mode, wherein the continuous mode comprises two or more operation cycles, wherein in a first operation cycle, generation of hydrogen gas in at least one of the two or more cells, in parallel to generation of oxygen gas in at least one different cell of the two or more cells and in a second operation cycle, generation of hydrogen gas in the at least one different cell of the two or more cells, in parallel to generation of oxygen gas in the at least one of the two or more cells.

2. The system according to claim 1, the system comprising:

two or more ETAC cells, each configured for holding an aqueous solution and comprising at least one electrode assembly, each having a cathode electrode and an anode electrode, said cathode electrode being configured to affect reduction of water in said aqueous solution in response to an applied electrical bias, to thereby generate hydrogen gas and hydroxide ions, said anode electrode being capable of reversibly undergoing oxidation in the presence of hydroxide ions, and undergoing reduction in the absence of bias, to generate oxygen gas, and a control unit configured to operate the two or more cells in accordance with a predetermined operational pattern.

3. The system according to claim 1, comprising a heat source or a heat exchanger.

4. The system according to claim 1, wherein the control unit is further configured to operate the two or more cells in accordance with a predetermined operational pattern, wherein the operational pattern provides for each cell in the two or more cells an output in a form of at least one of mode selector and operational parameter selector.

5. The system according to claim 1, wherein the control unit is further configured to operate the two or more cells in accordance with a predetermined operational pattern, wherein the operational pattern provides an output comprising at least one of (i) applied bias, (ii) timing for operation, and (iii) duration of operation of each of the two or more cells.

6. The system according to claim 5, wherein the operational pattern further provides a temperature value for each of the two or more cells.

7. The system according to claim 1, wherein the two or more cells are separated, having essentially no fluid or gas communication.

8. The system according to claim 1, further comprising at least one inlet and at least one outlet configured to allow circulation of the aqueous solution and of the gas in the system.

9. The system according to claim 8, wherein the at least one inlet is for receiving an aqueous solution into the two or more cells and at least one outlet for evacuating an aqueous solution and/or a gas from the two or more cells.

10. The system according to claim 1, wherein the electrode assembly is selected from mono-polar assembly, bi-polar assembly, flat assembly and rolled assembly.

11. The system according to claim 1, comprising at least one reservoir.

12. The system according to claim 1, comprising at least one phase separator configured to extract the gas.

13. The system according to claim 1, wherein the applied electric bias between the cathode and the anode electrodes in each of the at least one electrode assembly is at least 1.23V when measured at 25° C.

14. A method of generating hydrogen gas and/or oxygen gas, the method comprising:

in a system comprising two or more electrochemical thermally activated chemical (E-TAC) cells, each cell containing an aqueous solution, each cell comprising an electrode assembly having a cathode electrode and an anode electrode and at least two of said two or more cells are non-partitioned cells, wherein the method is operable in a continuous mode comprising two or more operation cycles, wherein in a first operation cycle, generation of hydrogen gas in at least one of the two or more cells, in parallel to generation of oxygen gas in at least one different cell of the two or more cells and in a second operation cycle, generation of hydrogen gas in the at least one different cell of the two or more cells, in parallel to generation of oxygen gas in the at least one of the two or more cells, wherein hydrogen gas is generated by applying an electrical bias between the anode and cathode electrodes of at least one of the two or more cells and oxygen gas is generated by discontinuing the bias applied between the anode and cathode within the at least one of the two or more cells.

* * * * *